United States Patent [19]

Goheen

[11] Patent Number: 6,094,640
[45] Date of Patent: *Jul. 25, 2000

[54] ELECTRONIC TICKETING AND RESERVATION SYSTEM AND METHOD

[75] Inventor: Joel R. Goheen, Boca Raton, Fla.

[73] Assignee: The Pugliese Company, Boca Raton, Fla.

[*] Notice: This patent is subject to a terminal disclaimer.

[21] Appl. No.: 08/948,479

[22] Filed: Oct. 10, 1997

Related U.S. Application Data

[63] Continuation of application No. 08/342,658, Nov. 21, 1994, Pat. No. 5,724,520, which is a continuation of application No. 08/074,072, Jun. 8, 1993, abandoned.

[51] Int. Cl.[7] .................................................. G06F 17/60
[52] U.S. Cl. ............................... 705/5; 235/380; 235/382
[58] Field of Search ......................... 705/5, 43; 235/379, 235/380, 382; 707/3, 6, 10

[56] References Cited

U.S. PATENT DOCUMENTS

| | | | |
|---|---|---|---|
| 3,622,995 | 11/1971 | Dilks et al. | 235/382 |
| 3,742,453 | 6/1973 | Poylo | 235/382 |
| 4,247,759 | 1/1981 | Yuris et al. . | |
| 4,298,793 | 11/1981 | Melis et al. . | |
| 4,449,186 | 5/1984 | Kelly et al. . | |
| 4,711,994 | 12/1987 | Greenberg . | |
| 4,794,530 | 12/1988 | Yukiura et al. . | |
| 4,797,542 | 1/1989 | Hara . | |
| 4,818,854 | 4/1989 | Davies et al. . | |
| 4,896,209 | 1/1990 | Matsuzak et al. | 348/8 |
| 4,931,932 | 6/1990 | Dalnekoff et al. . | |
| 5,051,565 | 9/1991 | Wolfram . | |
| 5,066,853 | 11/1991 | Brisson . | |
| 5,237,499 | 8/1993 | Garback . | |
| 5,247,160 | 9/1993 | Zicker . | |
| 5,253,166 | 10/1993 | Dettelbach et al. . | |
| 5,401,944 | 3/1995 | Bravman et al. . | |
| 5,504,321 | 4/1996 | Sheldon . | |
| 5,680,460 | 10/1997 | Tomko et al. . | |

FOREIGN PATENT DOCUMENTS 60-146360   8/1985   Japan .

OTHER PUBLICATIONS

Anonymous, "Can 'Techie Bonding' Overcome Bad Blood? With the AT&T deal done, the partners swear they'll get along", Business Week, No. 3214, p. 39, May 20, 1991.

Dialog file 563 (ICC Int. Bus. Res), No. 1111385, Anonymous, "Key Note Business Travel—An Industry Sector Review" 3 pages, Aug. 1, 1988.

"Flying in the '90s: Mini–Tvs, Ticketless Service" Phoenix Gazette (PG), Dec. 1989, C. Jouzaitis.

"No Tickets Necessary", Travel Agent Magazine, Nov. 20, 1989, p. 10.

(List continued on next page.)

*Primary Examiner*—Emanuel Todd Voeltz
*Assistant Examiner*—Alexander Kalinowski
*Attorney, Agent, or Firm*—Antonelli, Terry, Stout & Kraus, LLP

[57] ABSTRACT

A method and system of issuing an electronic authorization and validation for pre-scheduled activities such as airline reservations to eliminate paper tickets. The passenger makes the reservation and allows a reservation operation center to charge the passengers credit card company. A reservation number is issued in the computer. The passenger utilizes a plastic I.D. card that accesses computer for validation purposes. An automatic teller machine, at the airport, allows the passenger to receive specific flight information, departure gate information and the like by the insertion of the I.D. card. A mobile airline communications system at the departure gate includes a cellular telephone network connected to a lap top computer and a magnetic card reader that provides validation of the reservation and payment to an airline employee at the departure which allows the passenger to board the aircraft. The system may be utilized for hotel reservations, car rentals and other types of pre-scheduled, pre-payable activities that require authorization and validation at each scheduled activity.

22 Claims, 3 Drawing Sheets

OTHER PUBLICATIONS

"High Tech Opening Doors for Agencies", Business Travel News, Jul. 1991, p. 18.

"VIEWPOINT: Pursuing Ticketless Air Travel", Business Travel News, Sep. 1992, p. 10.

"Airlines Investigate Potential of Ticketless Passenger Flights", Aviation Week & Space Technology, Nov. 1986, p. 96, vol. 125, No. 18.

"Special Report: Automation and Air Transport", American's Parent Company Developing Automation Products, Computer Services, Aviation Week & Space Technology, Nov. 1986, p. 71, vol. 125, No. 18.

"Will Self–Ticketing Machines Take Off at Convenience Stores? A Quart of Milk, a Loaf of Bread & A $4,000 Dream Trip", L. Bly, Orange County Register, Morning Final Section: Travel Page, IT.

"Morris Air Offers Ticketless Booking Capability to Travel Agents", Airline Marketing News, Nov. 1983, vol. 1, No. 3.

"Chargit—Services Data", Annual Report, 1985, p. 0.

"Automated Ticketing is it Finally Here", Dana K. Henderson, Air Transport World, vol. 25, No. 8, p. 58.

"Airlines Eye Mag Stripe Vote", Tour & Travel News, May 1990, p. 29.

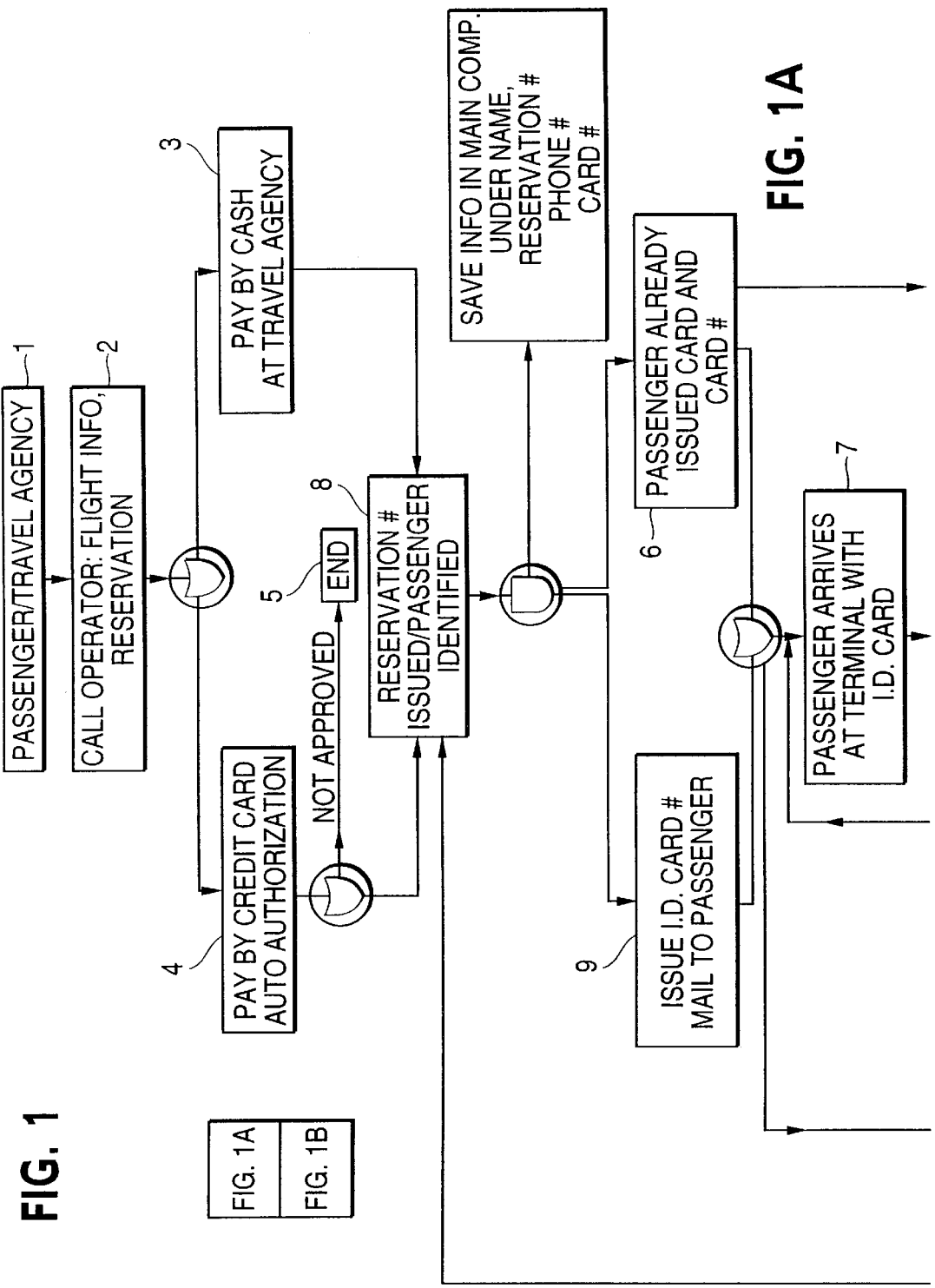

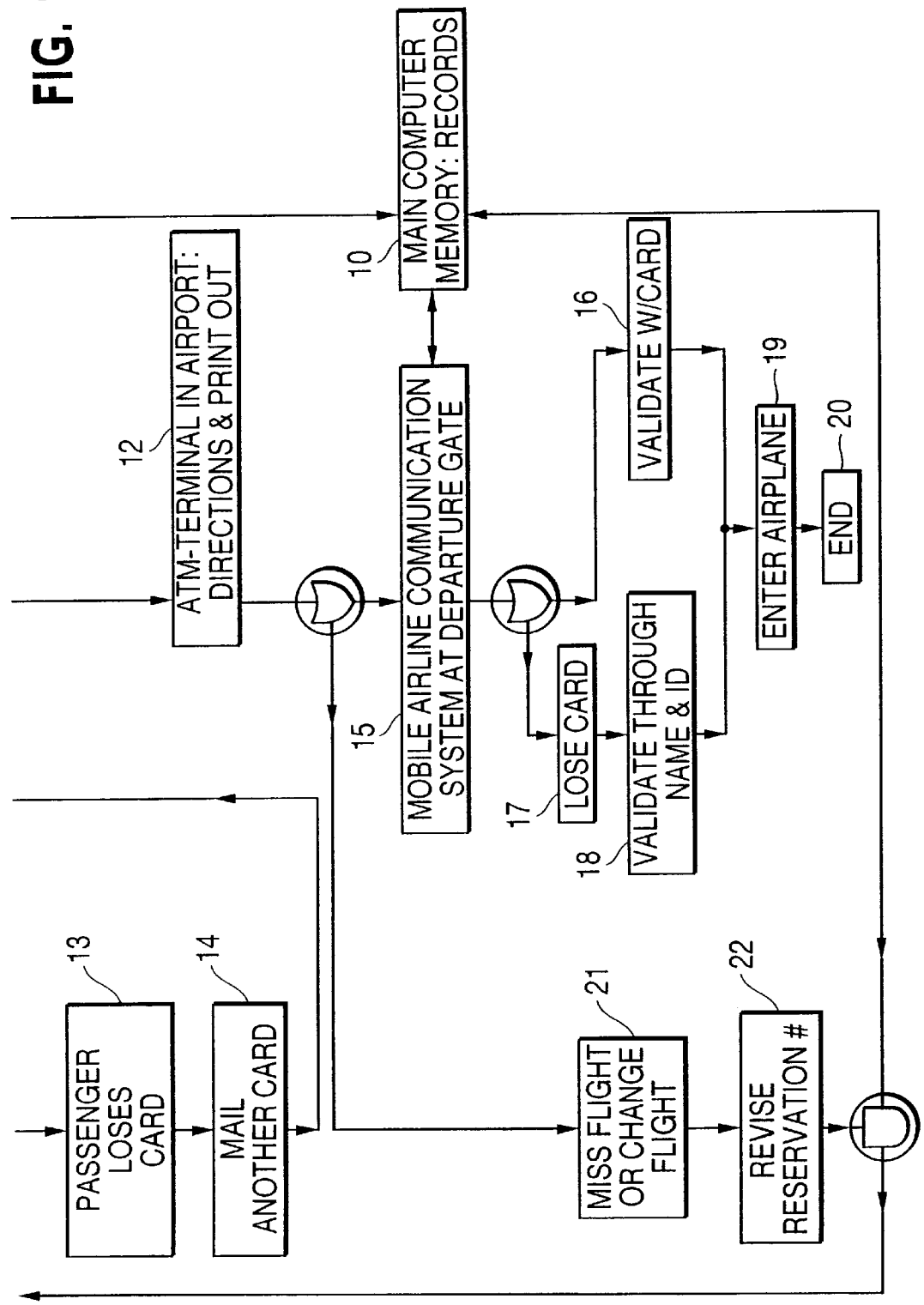

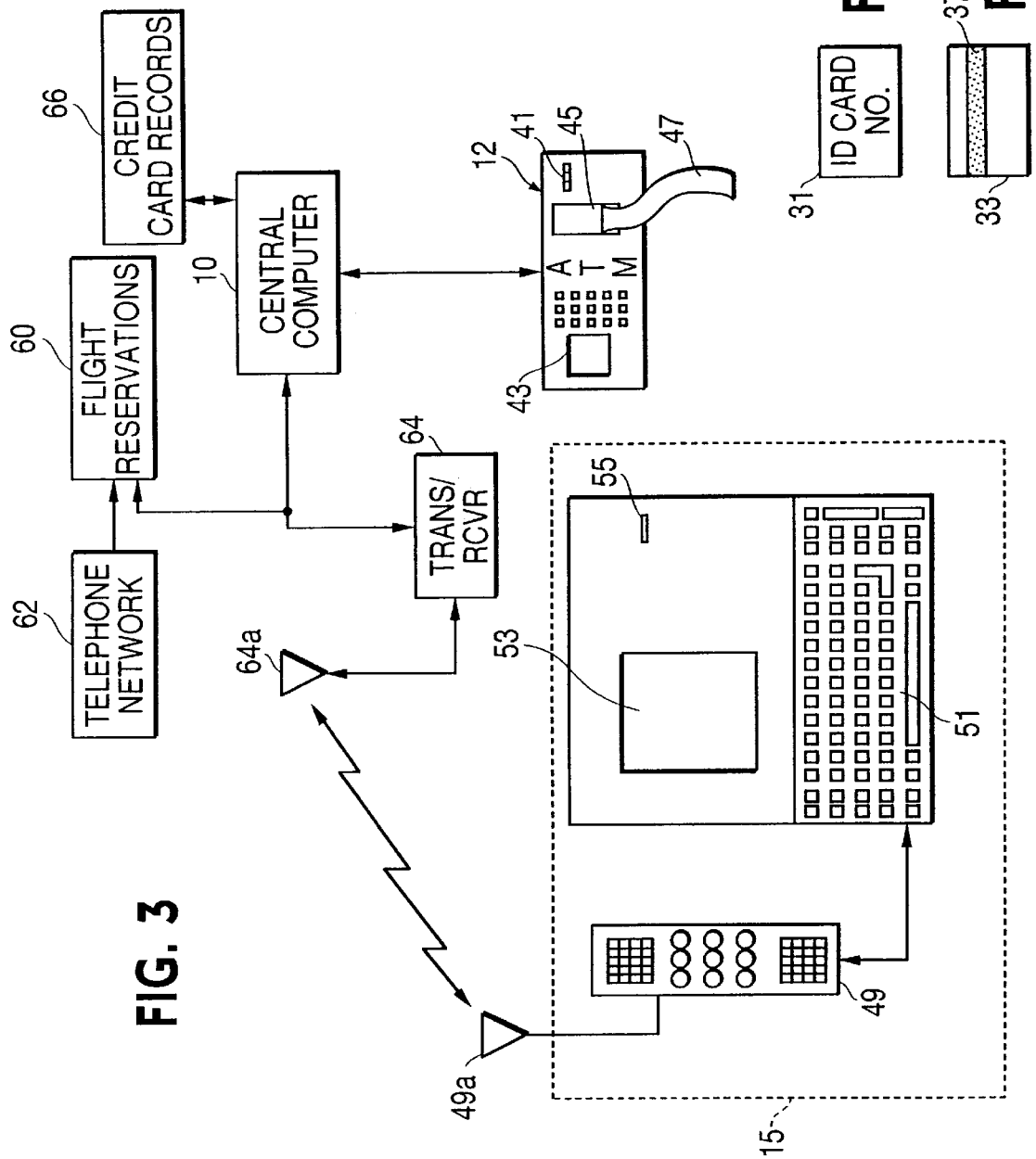

ELECTRONIC TICKETING AND RESERVATION SYSTEM AND METHOD

This application a Continuation of application Ser. No. 08/342,658, filed Nov. 21, 1994, now U.S. Pat. No. 5,724,520, issued Mar. 3, 1998, which is a continuation of application Ser. No. 08/074,072, filed Jun. 8, 1993, now abandoned.

BACKGROUND OF THE INVENTION

1. Field of the Invention

The present invention relates to a system and method of providing an electronic reservation and individual validation for various activities, including boarding a common carrier, and more particularly, relates to a method and system to provide an electronic individual activities reservation and validation, eliminating tickets and other paper receipts. A plastic card may also be employed with an encoded magnetic strip to identify the card holder in lieu of a paper carbon ticket for fast and efficient check-in, boarding and access to common carriers, hotels, and other activities.

2. Description of the Prior Art

Since the first days of common carriers such as commercial airlines flight, the airlines have been burdened with the job of making reservations and writing or printing out passenger tickets on paper. Although the airline ticket of today is printed on a special paper with a style difficult to counterfeit, the reservation and ticketing process has essentially remained the same. A passenger, either through the airline or ticket agent, pays for passage and a corresponding paper ticket is issued. This paper ticket is then surrendered to persons at the departure gate upon entry onto the aircraft. Likewise, in other industries, such as the hotel industry, the reservations system also includes check-in processing, paperwork, and the issuance of keys to particular individuals traveling.

The fundamental problem is validating that a particular individual has reserved and prepaid for particular activities or services, and that the particular individual continues to be valid throughout an activity process, whether making a reservation for an airline trip, boarding the aircraft, or checking into a hotel and going to a particular room. There are inherent problems in this process. Using the airlines as an example, these include the burdens of making individual reservations and payment, always having to have the correct type and style paper ticket on hand for ticket printing, and the inability for these tickets to be reused if mistakes occur or flight changes are necessary which happen often. Further, if a ticket is lost or a passenger misses a flight, an added dilemma occurs in that new tickets must be drawn up. Although a written record is usually available for the airline and passenger, this process creates an added burden since the airline ticket agent must perform the task of checking and determining the new and previous flight information for each new ticket. Moreover, the flight attendant at the departure gate must gather and hold each ticket upon passenger boarding. Often, tickets get lost or are mixed with other flights, which requires tedious work and wasted time in locating, interpreting, and arranging the misplaced tickets. Even after tickets are collected at the gate, manual sorting is often necessary to determine which passengers have boarded the correct flight and which flights were at capacity and, therefore, profitable. The key problem is validating the reservation and payment of the individual throughout the process without slowing the process at particular check points such as aircraft boarding. Similar problems exist in the hotel industry and the car rental industry.

Ticketing systems are known in the prior art. U.S. Pat. No. 4,449,186, issued to Kelly et al. on May 15, 1984, shows a self-ticketing system. This system essentially continues the paper problem and is used for vending airline tickets. U.S. Pat. No. 4,298,793, issued to Melis et al. on Nov. 3, 1981, shows a portable element, like a card, that stores and provides reservation system information. None of these systems focus particularly at validating a particular individual as to the fact that individual reservations have been made, individual payment has been made, and this individual should be able to traverse through the system without being mired in endless paper and waiting in lines. With the above problems causing much delay and loss of efficiency due to the amount of clerical work involved in keeping an accurate account of the great numbers of paper tickets issued, the present invention was developed.

SUMMARY OF THE INVENTION

The present invention is directed to a communication system and method to electronically, continuously validate an individual as to reservations and payment with respect to various preplanned activities, such as airline travel, hotel stays, and car rental. The system connects a main computer system storing basic information to mobile lap top individual computers at remote sites in order to exchange personal database validation information for an individual and preplanned activities. Reservations and payment information includes both sales control and holder validity at the critical sites. Each mobile computer includes a card reader to expedite pass through of the individual at each process check point.

Using the airlines as an example, the present invention method and system is now described. Typically, the common carrier reservation process starts with a would be passenger contacting the airline via a travel agent or contacting the airline directly through a toll free 800 telephone number. The airline reservation operator, who answers the call, provides flight availability information. Once the passenger elects to reserve passage, reservation information is obtained. This reservation information is basically the passenger's personal identification (name and telephone number) and the form of payment used. If a passenger elects to pay by credit card, the airline main computer is designed and includes software to automatically seek and determine authorization from the credit card company. If the passenger desires to make payment using the credit card method, the airline main computer will transfer the funds and store the passenger reservation information and assign an authorized reservation number. A cash or check payment at a travel agency, once verified, will also result in a reservation number in the main computer.

Upon the first, initial reservation, the passenger is issued an identification plastic card and with a card number. The plastic card is used for passenger identification and validation. The card number only is encoded onto a magnetic strip at the back of the plastic identification card. The card is mailed to the passenger with an itinerary and instruction pamphlet attached. The instruction pamphlet informs the passenger of the proper use of the identification card upon arrival at the airport. The identification card can be used again and again for different flights.

At the airport, the passenger proceeds to a special identification card automatic teller machine (ATM). One or more of these ATM are preferably placed throughout a designated airline terminal. After identifying the machine, a passenger passes or swipes the identification card through a magnetic card reader attached to the special ATM. The card number is identified by ATM which is electrically connected to the main or central computer holding the payment and reservation validation information. The remotely located central computer communicates with the ATM and processes the card number derived from the magnetic strip. A greeting, welcome information, and passenger directions are displayed on a CRT screen, which directs the passenger to an appropriate counter for baggage check. The passenger is also instructed as to the proper concourse and gate of aircraft departure. A written printout may be also included with all the information which has been displayed on the CRT screen. The printout is supplied through an attached printer, within the ATM, directly to the passenger. The printout is only to provide relevant information and is not a ticket.

After the passenger's baggage has been checked and the passenger arrives at the departure gate, a flight attendant awaits each passenger before boarding. The flight attendant uses a lap top or notebook type portable computer with a built in cellular telephone and magnetic card reader, hereinafter referred to as a mobile airline communication unit. The passenger identification card is swiped through the magnetic card reader, where the main or central computer communicates to the mobile computer by cellular telephone, validates the specific card identification number and reservation number and passenger authorization entry to the aircraft. The mobile airline communication unit including the lap top computer is both uploaded and downloaded frequently to the main computer in order to provide a current record in the main computer of updated passenger validation information, such as flight reservations and payment, passenger boarding and flight information.

The plastic card forms the basis for identification only of the particular individual. The card has a card number encoded magnetically that is utilized with the appropriate card reader technology to activate the main computer and provide a subsequent validation or authorization with respect to particular reservations, be it for airlines, hotels or rental cars or the like. The specific reservation information is not put on the card. Once payment has been authorized, for example for an airline ticket, the main computer has a reservation number that is associated with a particular card number once the card is read and the computer is questioned as to authorization of a particular reservation. Therefore, once the particular individual who is also identified by a particular card number has paid for the particular reservation, at each step in the process, such as the boarding gate or hotel check-in, inserting the I.D. card into a card reader provides authorization and verification of the reservation and payment allowing the person to pass through the system continuously without requiring paper at each step of the way. In fact, the person can pass through the system even if the person loses the card by using the person's name which again will be transmitted to the main computer that shows that there is an existing reservation number that has been paid for and is authorized. The I.D. card makes it quicker and faster so that the airline personnel at each check point do not have to enter any information to pulse the main computer but can merely allow the individual to swipe the card or put the card in a card-reader and pass on through.

In the event a passenger misses a flight or requires a flight change, the main computer itself or the airline reservation center office can transfer the specific passenger reservation and payment validation to a revised flight reservation. Until the card is swiped during boarding at the mobile airline communication unit, the card number will indicate in the main computer a valid reservation that can be used on a particular flight. Once the card is magnetically swiped upon boarding, however, the mobile unit uploads the authorization to the main computer, thereby cancelling the validation number for that particular flight reservation. The identification card and its number continue to identify a particular person but no particular reservation authorization is listed in the main computer preventing intentional or unintentional misuse in the future.

The main computer may be large main frame holding passenger and airline flight reservation and payment information under the passenger's name, phone number, reservation number and passenger's card identification number and reservation #. The main frame computer is also capable of retaining passenger flight records for flight bonus programs and frequent flyer mileage totals. If a passenger were to lose his identification card immediately prior to boarding, the flight attendant can access a special validity bank within the main computer with the card number. This is accomplished by entering a passenger's name or card number manually into the mobile unit on the attached keyboard. Proof of identity will then be the only requirement before boarding is permitted. The card is therefore not a requirement for boarding the aircraft.

Therefore, it is the principal object of the invention to provide a method and system of issuing an electronic validation to an individual for reservations and payment, for preplanned activities such as flight reservations, hotel reservations or rental car reservations.

It is a further object of the invention to provide a method of electronic validation to eliminate paper ticketing.

It is still a further object of the invention to provide a method of providing a personal and accurate up-to-the-minute information with common carrier passengers through the use of a automated teller machine used with an electronic validation system.

It is still a further object of the invention to provide a method for supplying a passenger with baggage check and gate information using an automated teller system with associated screen and printer.

It is still a further object of the invention to provide a method of supplying a flight attendant at a departing gate with a mobile communication unit for reading magnetically encoded information from an electronic card to validate an individual passenger's payment for input into a mobile remote computer system.

In accordance with these and other objects which will be apparent hereinafter, the instant invention will now become described with particular reference to the accompanying drawings.

BRIEF DESCRIPTION OF THE DRAWINGS

FIGS. 1, 1A, and 1B illustrate a flow chart depicting the method of the present invention.

FIG. 2A illustrates the front side of an identification card of the present invention.

FIG. 2B illustrates the rear side of an identification card shown in FIG. 2A.

FIG. 3 illustrates diagrammatically the system utilized in the present invention including the general configuration of the main computer, the mobile computer communication unit and card reader and an automated teller machine.

DESCRIPTION OF THE PREFERRED EMBODIMENTS

A flow chart of the method describing a system using the instant invention is shown in FIGS. 1, 1A, and 1B. An airline reservation is selected as an example. A would be passenger or travel agent 1 contacts the airline flight information and reservation center generally via a toll free telephone number.

The flight information reservation center is the central calling point where the airline or private company who handles all the reservations and authorizations operates with a regular telephone network and with call-in access from cellular telephones. A main computer is maintained at the reservation center. Once a passenger or the travel agency calls in, flight information is given for a specific flight. If an individual calls in, payment is made by a credit card which is automatically accessed while the passenger is on the telephone line, which transfers the payment at that moment to the airline. Credit card payment is verified while the passenger is on line. If the travel agent 3 handles the transaction, then payment must be made by cash or money order or credit card to the travel agent. The travel agency will then have a relationship with the airline or the reservation center as far as transfer of money once payment has made by cash by the passenger. In any event, after authorized payment has been made, a reservation number for a particular flight is then issued in the computer and identified with a particular passenger name and I.D. card number. Obviously if the credit card authorization is not approved, then the transaction would end at block 5 and no further reservation would be made. The reservation number issued at block 8 that identifies the passenger would cause either the issue of a specific plastic I.D. card at 9 which is mailed to the passenger and includes only a card I.D. number only, or if the passenger already has in his possession a plastic card with a card number, the reservation number is then identified along with the card number.

At this point then, the passenger will have in his possession an I.D. plastic card with a number on it. The reservation for a particular flight is stored in the computer and the payment has already been authorized and made to the airline. The passenger then arrives at 7 at the terminal with the I.D. card.

Referring now to FIG. 1B the passenger will arrive at the terminal at an ATM 12 in the airport. The I.D. card is put into a card reader in the ATM which can provide on a CRT or other type of screen directions and information concerning the flight where to go for baggage check-in, what gate to go to for the flight itself. This information can be displayed on a screen only or can be provided also as a print out. If the passenger loses card at 13 then another card can be mailed with the same I.D. number.

Once the passenger has received directions from the ATM at 12, the passenger proceeds to the departure gate area where the baggage is checked. At the departure gate the mobile airline communications system 15 is employed by the airline. Typically, airline personnel such as stewards and stewardesses can man the mobile airline communications system which is comprised of a cellular telephone connected to a lap top computer and includes a magnetic card reader. The passenger hands the card to the airline personnel that uses the card and the card reader where the lap top or portable computer and the cellular telephone network instantly verifies and validate that the passenger has a reservation on that particular flight and that the payment has been made for the, flight. This is individual personal validation at the departure gate which then allows the passenger to enter the plane. The mobile airline communication system will be communicated by cellular telephone with the main computer memory and records to provide proper validation. Thus, the passenger is validated with the card at 16 and enters the airplane 19. At this time the authorization number and reservation number once the passenger has entered the airplane is removed. Should the passenger lose the card at the mobile airline communication system the passenger can still be validated just by providing the passenger's name and/or the I.D. card number and proper identification. The card I.D. number is the access number that gets into the main computer records that provides for all reservation and validation information. Obviously, if the passenger loses the I.D. card then the passenger must provide personal identification such as a driver's license or the like.

Going back to the terminal in the airport and the ATM 12, should the passenger miss the flight or decide to change the flight this can be accomplished by calling the reservation center and making flight reservations providing for a revised reservation number that includes the new flight number and payment authorization. The use of the present system eliminates all paper ticketing at each step of the way whether it's arriving at the airport or arriving at the departure gate where the person can using the plastic I.D. card have it entered into the card reader and ensure validation with the airline personnel at the boarding gate. This can be done even without the I.D. card but of course it will slow things down if the passenger has to provide name and identification at the boarding gate.

The system can be employed not only for common carriers such as airlines or other similar type reservations but can be used for hotel reservations with prepayment established for a fixed check-in and check-out times with the check-in at the hotel being with an ATM automatic teller machine that provides the room number where a card could also be used to activate the room door by-passing the desk completely for check-in and check-out purposes. This would also include credit card authorization in a network where expenses incurred at the hotel be automatically charged to the credit card network. Check-out of the hotel could be accomplished by merely inserted the card in the card reader and noting that the time and date that the hotel participant left. One of the key elements in the system is the mobile or land airline communication system which allows for a card reader computer activation through a cellular or land telephone network with the main computer to provide mobile pre-site locations for identifying and authorizing the reservation and the fact that it was prepaid and that the person is therefore validated. Such mobile sites can be set-up anywhere where it be in the airport, a train station, hotels or at car rental places.

Referring now to FIG. 2A and FIG. 2B the typical plastic I.D. card is shown which is conventional in nature that only contains on the magnetic bar strip 37 the particular I.D. number of the card itself but does not include any reservation authorization information perse. The front of the card in FIG. 2A is shown 31 displaying the I.D. number only, while the back of the card shows in FIG. 2B a magnetic strip 37. The card is useful for expediting entrance and egress in various particular environments for instant authorization and validation of the particular person by permitting use at the automatic teller machine for providing information, and an I.D. for boarding the aircraft or accessing a hotel room or renting a car by merely inserting the I.D. card in a card reader for verification and validation of the person.

Referring now to FIG. 3, the invention is shown comprised of a central computer 10 which is a main frame computer that holds all the basic flight information, the reservation name of the passenger, the telephone number of the passenger, the reservation number assigned to the passenger once payment and the identification card number of the passenger along with information concerning authorization and payment validation and access to the passenger's credit card company records. Central computer has an input at flight reservations 60 that allows for flight reservations to input and access the central computer at all times. A telephone conventional network 62 allows for call-in on a 800 number to personnel at flight reservations 60 for making a particular reservation on a aircraft. The central computer also gets access through a transmitter and receiver system 64 that is explained in greater detail below. The central computer is also connected to an automatic teller machine 12 typically located at the airport terminal, as described below. The system also utilizes a mobile airline communication device 15 which includes a cellular telephone 49 having an antenna 49A and a lap top computer 51 that includes a visual display 53 and a magnetic card reader 55. Therefore, the system is operated as follows. A passenger or travel agency utilizes the conventional telephone network 62 and calls the airline flight information and reservation service center 60. A flight reservation is then determined in central computer 10 to be available and if available passenger name, address, phone number is entered while the credit card records 66 at the passenger's credit card company are questioned by the central computer for payment authorization and verification. If a passenger has an I.D. card already, then the I.D. number will pull up that file. If the passenger does not have an I.D. card, then an I.D. card number is assigned when the reservation number is assigned. If sufficient funds are available, then the central computer transfers funds to the airline through the credit card records. At this point a reservation number is created in the central computer and validated for a particular passenger and the passenger I.D. card number. Reservation operations center would then mail out the I.D. plastic card with the I.D. number to the passenger. If the passenger already has a pre-issued plastic I.D. card number, then the itinerary is mailed. The passenger would then go to the airport terminal on the day of the flight and upon walking into the terminal will see an automatic teller machine 12. The automatic teller machines includes a card reader slot 41 which is attached to a magnetic card reader connected to the automatic teller machine. A CRT or other visual display 43 provided at the automatic teller machine, along with a printer 45 that includes a printout tape 47 to provide same information printed out, as provided on the display screen 43. Once the passenger puts the card in the card reader 41 the visual display will tell information such as departure gate, baggage check-in area, time of flight, flight number and other relevant information directions how to get to the gate for the passenger. The information may be printed out also on tape 47. The passenger would then proceed to baggage check-in and then on to the departure gate.

At the departure gate the mobile airline communications system 15 is employed by one or more employees of the airline such as stewards and stewardesses who will also be departing on the flight. Each airline person can use a lap top computer 51 that has also a magnetic card reader slot 55 and a magnetic card reader device electrically connected therein and a visual display screen 53 to provide verification and validation information to the airline employee. The lap top computer includes a cellular telephone 49 having an antenna 49A connected electrically thereto which allows for transmission of information from the lap top computer back to the central computer through the transmitter receiver 64 for instant validation of the particular passenger once the plastic identification card is inserted into the magnetic card reader slot 55. The mobile airline communications system 15 is therefore portable and is carried on and off the flight by the airline personnel. Thus the passenger to board the aircraft need only hand the plastic I.D. card to the airline personnel who places it in the lap top computer and looks at the screen receiving an authorization or validation that person has paid for a particular flight and that this is the proper flight. Using the mobile airline communications system 15 mobile sites can be selected anywhere and still allow access to the central computer whether it is at different boarding gates if changes have to be made and which can be carried with the airline personnel alleviating the necessity for excessive number of permanent gate operating employees. The flight personnel can also use the mobile airline communications system at all subsequent stops and route for each boarding passenger at the boarding site. Should the passenger lose the I.D. card or not have the I.D. card available at the boarding gate, then the airline personnel can enter the information manually into the lap top computer 51 as to the person's name and still obtain a validation and authorization on the visual screen. At this point the passenger would have to produce personal identification proof so that the person could be allowed on board the aircraft.

Thus, the present system allows for a particular individual to be personally validated at various check points along with a preplanned activity without the necessity of using paper ticketing for check-in and boarding purposes.

The overall system could also be employed for hotel reservations wherein the reservations are made and the payment is made. Once the party checks into the hotel with the plastic I.D. card at a mobile check-in station, the person could proceed to the room designated where the card could also be used to access the room for certain periods of time that are authorized by the central computer. Check-in and check-out could be eliminated. Additional information could be provided in an automatic teller machine provided in the hotel or in the mobile communications system, as desired.

Finally, the system could be used in other environments such as requiring prepaid, prepaid planned activities such as renting an automobile. Again, the I.D. card would be used to access a mobile station at the check-out car center which provides authorization and automatically provides the keys after authorization to allow the party to use the car.

The use of the I.D. card allows for expeditious handling and transfer and validation at each point along the way. Card I.D. number which is coded on the card provides the particular access to the central computer containing information on schedules, prepayment, flight information.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for validating a reservation for a prescheduled activity, in order to eliminate the need for paper tickets, said method comprising the steps of:

making a reservation for a particular prescheduled activity and a particular individual without issuing a paper admission ticket to the individual;

storing reservation data, which identifies the individual and the particular prescheduled activity for which the reservation has been made, in a reservation data storage area of a central data bank; and transmitting personal identification information, which is obtained from the individual at a selected location at which the activity is available, to verify the reservation for the particular prescheduled activity, by accessing the reservation data stored in the central data bank, and effect automatic validation at the selected location to permit the individual to participate in the particular activity without requiring a paper ticket, whereby access to prescheduled activities can be effected without the need for issuing a paper ticket to the participating individual;

wherein said prescheduled activity is an airline flight, and further including the step of:

updating the reservation data of an individual for a particular flight reservation from the reservation data storage area of the central data bank, after personal identification information for the individual is communicated to the central data bank and the reservation has been verified, to include in the reservation data an indication that the individual has boarded the airplane for the particular flight.

2. A method for validating a reservation as defined in claim 1, wherein said central data bank also stores flight mileage information for a flight bonus program for individual passengers, the method further including the step of:

updating the flight mileage information in said central data bank for an individual who has boarded an airplane to reflect the flight mileage for the particular flight.

3. A method for validating a reservation as defined in claim 1, wherein said selected location is an airline terminal, and further including the steps of:

providing data communication at a location of said airline terminal, serving as a baggage check facility, to communicate an individual's personal information to said central data bank to verify the individual's flight reservation and obtain flight information for the flight on which baggage is to be checked; and checking baggage in response to a flight reservation verification received from said central data bank without requiring the individual to present an airline ticket.

4. A method for validating a reservation for a prescheduled activity, in order to eliminate the need for paper tickets, said method comprising the steps of:

making a reservation for a particular prescheduled activity and a particular individual without issuing a paper admission ticket to the individual;

storing reservation data, which identifies the individual and the particular prescheduled activity for which the reservation has been made, in a reservation data storage area of a central data bank; and transmitting personal identification information, which is obtained from the individual at a selected location at which the activity is available, to verify the reservation for the particular prescheduled activity, by accessing the reservation data stored in the central data bank, and effect automatic validation at the selected location to permit the individual to participate in the particular activity without requiring a paper ticket, whereby access to prescheduled activities can be effected without the need for issuing a paper ticket to the participating individual;

wherein said prescheduled activity is an automobile rental, and further including the step of providing a printout of information relating to said automobile rental at said selected location at which an automobile is available in response to verification of the automobile rental reservation.

5. A ticket-less airline reservation method, comprising the steps of:

operating a flight reservation center to make a particular flight reservation for a passenger utilizing a telephone call-in system;

storing flight reservation information in a reservation data area of a central data bank for a passenger who has made a particular flight reservation via said flight reservation center and who has an identification card on which there is stored the passenger's identification information but no flight information or flight reservation information; and establishing remote locations at which said passenger may use said personal identification card to access the passenger reservation information from the central data bank, including the step of providing data communication at a remote location, serving as a boarding gate of a flight, to communicate the passenger's personal information from the card to said central data bank for verifying the passenger reservation for that flight prior to allowing the passenger to board, thereby eliminating the need for paper airline tickets;

further including the step of:

updating the reservation data of the passenger for the particular flight reservation from the reservation data storage area of the central data bank, after the identification information on the card is communicated to the central data bank and the reservation has been verified, to include in the reservation data an indication that the passenger has boarded the airplane for the particular flight.

6. A ticket-less airline reservation method as defined in claim 5, wherein the step of establishing remote locations further includes the steps of:

providing data communication at a further remote location, serving as a baggage check facility, to communicate the passenger's personal information from the card to said central data bank to verify the passenger reservation and obtain flight information for the flight on which baggage is to be checked; and checking baggage in response to a flight reservation verification received from said central data bank without requiring the passenger to present an airline ticket.

7. A ticket-less airline reservation method, comprising the steps of:

operating a flight reservation center to make a particular flight reservation for a passenger utilizing a telephone call-in system;

storing flight reservation information in a reservation data area of a central data bank for a passenger who has made a particular flight reservation via said flight reservation center and who has an identification card on which there is stored the passenger's identification information but no flight information or flight reservation information; and establishing remote locations at which said passenger may use said personal identification card to access the passenger reservation information from the central data bank, including the step of providing data communication at a remote location, serving as a boarding gate of a flight, to communicate the passenger's personal information from the card to said central data bank for verifying the passenger reservation for that flight prior to allowing the passenger to board, thereby eliminating the need for paper airline tickets;

wherein said central data bank also stores flight mileage information for a flight bonus program for individual passengers, the method further including the step of:

updating the flight mileage information in said central data bank for a passenger who has boarded an airplane to reflect the flight mileage for the particular flight.

8. A ticket-less airline reservation method, comprising the steps of:

operating a flight reservation center to make a particular flight reservation for a passenger utilizing a telephone call-in system;

storing flight reservation information in a reservation data area of a central data bank for a passenger who has made a particular flight reservation via said flight reservation center, without issuing a paper airline ticket to the individual for the reserved flight; and establishing remote locations at which said passenger may access the passenger reservation information from the central data bank, including the step of providing data communication at a remote location, serving as a boarding gate of a flight, to communicate personal identification information received from the passenger to said flight reservation center for verifying the passenger reservation for that flight prior to allowing the passenger to board, thereby eliminating the need for paper airline tickets;

further including the step of:

updating the reservation data of the passenger for the particular flight reservation from the reservation data storage area of the central data bank, after the personal identification information of the passenger is communicated to the central data bank and the reservation has been verified, to include in the reservation data an indication that the passenger has boarded the airplane for the particular flight.

9. A ticket-less airline reservation method as defined in claim 8, wherein the step of establishing remote locations further includes the steps of:

providing data communication at a further remote location, serving as a baggage check facility, to communicate a passenger's personal information to said central data bank to verify the passenger reservation and obtain flight information for the flight on which baggage is to be checked; and checking baggage in response to a flight reservation verification received from said central data bank without requiring the passenger to present an airline ticket.

10. A ticket-less airline reservation method, comprising the steps of:

operating a flight reservation center to make a particular flight reservation for a passenger utilizing a telephone call-in system;

storing flight reservation information in a reservation data area of a central data bank for a passenger who has made a particular flight reservation via said flight reservation center, without issuing a paper airline ticket to the individual for the reserved flight; and establishing remote locations at which said passenger may access the passenger reservation information from the central data bank, including the step of providing data communication at a remote location, serving as a boarding gate of a flight, to communicate personal identification information received from the passenger to said flight reservation center for verifying the passenger reservation for that flight prior to allowing the passenger to board, thereby eliminating the need for paper airline tickets;

wherein said central data bank also stores flight mileage information for a flight bonus program for individual passengers, the method further including the step of:

updating the flight mileage information in said central data bank for a passenger who has boarded an airplane to reflect the flight mileage for the particular flight.

11. An electronic communication system for providing reservations and authorization for a particular individual to access a prescheduled activity using only personal identification information, said system comprising:

a central storage for storing reservation data concerning a prescheduled activity and information which relates a particular individual, who has made a reservation for the prescheduled activity, to the stored reservation data;

an identification card for accessing reservation data from said central storage, said card comprising storage means for storing information personal to an individual to identify that individual and not information concerning a prescheduled activity for which the individual may make a reservation;

sites remote from said central storage at which reservation information may be accessed from said central storage, said information sites each comprising a computer and a telecommunication connection between said computer and said central storage to verify reservation information on site at the location of said prescheduled activity, said computer comprising an identification card reader for reading the magnetic means on the identification card to identify an individual to the central storage, which central storage includes means responsive to personal information received from a remote site via said telecommunication means for verifying a reservation and authorizing the identified individual to participate in the prescheduled activity without requiring the individual to present a paper ticket which identifies the activity;

an automatic teller machine at the remote information sites for providing information relating to the prescheduled activity for which an individual has a reservation, said automatic teller machine comprising a card reader, a printer and a display terminal;

wherein the same identification card may be used over and over again for admission to additional activities without the need for either issuing a new card or a ticket or for updating the card prior to each activity; and wherein said prescheduled activity is an automobile rental, and said computer at each remote site includes means for printing out and displaying directions to the location of the automobile to be rented and other information relating to said rental.

12. A method of validating a reservation for and obtaining access to accommodations in a place of lodging, comprising the steps of:

making a reservation for a particular accommodation in a place of lodging for a particular individual and for a particular time period;

issuing to the particular individual a personal identification card having stored thereon identification information corresponding to the individual, but no specific reservation information, in response to the making of said reservation for the particular individual;

storing reservation data, which identifies the particular individual, the particular accommodation and the particular time period for which the reservation has been made, along with credit account information of said particular individual, in a reservation data storage area of a data bank;

reading the personal identification card issued to the particular individual at said place of lodging to verify the reservation for the particular individual, by accessing the reservation data stored in the data bank;

providing to said particular individual information identifying the accommodation reserved for said particular individual at said place of lodging in response to verification of the reservation;

controlling access to said accommodation to permit access by said particular individual only during said particular time period, as specified by said reservation information, using said personal identification card; and allowing said particular individual to charge goods and services at said place of lodging using said personal identification card during said particular time period once said reservation has been verified;

whereby the same personal identification card may be used over and over to obtain repeated access to said accommodation during said particular time period without the need for issuing a new identification card or updating the information stored on the identification card prior to each use thereof.

13. A method as defined in claim 12, wherein said accommodation has a locked entrance, and said step of controlling access to said accommodation includes opening said locked entrance using said personal identification card as a key.

14. A method as defined in claim 12, further including the steps of reading the personal identification card of an individual at the time the individual checks out of the place of lodging, and storing in the data bank the time and date on which the personal identification card was read at check-out for purposes of billing the individual for the time during which accommodations were used by the individual.

15. A method as defined in claim 12, wherein said personal identification card is issued to said particular individual before the individual arrives at said place of lodging.

16. A method as defined in claim 12, wherein said personal identification card is read at said place of lodging without the assistance of an employee of said place of lodging.

17. A method as defined in claim 12, wherein said accommodation has a restricted entrance, and said step of controlling access to said accommodation includes permitting access through said restricted entrance by use of said personal identification card.

18. A method as defined in claim 12, further including the step of allowing said particular individual access to goods and services of said place of lodging by use of said personal identification card during said particular time period once said reservation has been verified.

19. A method of validating a reservation for and obtaining access to accommodations in a place of lodging, comprising the steps of:

making a reservation for a particular accommodation in a place of lodging for a particular individual and for a particular time period;

issuing to the particular individual a personal identification card having stored thereon identification information corresponding to the individual, but no specific reservation information, in response to the making of said reservation for the particular individual;

storing reservation data, which identifies the particular individual, the particular accommodation and the particular time period for which the reservation has been made, along with credit account information of said particularly individual, in a reservation data storage area of a data bank;

reading the personal identification card issued to the particular individual at said place of lodging to verify the reservation for the particular individual, by accessing the reservation data stored in the data bank;

providing to said particular individual information identifying the accommodation reserved for said particular individual at said place of lodging in response to verification of the reservation;

controlling access to said accommodation to permit access by said particular individual only during said particular time period, as specified by said reservation information, using said personal identification card; and allowing said particular individual to charge goods and services at said place of lodging using said personal identification card during said particular time period once said reservation has been verified;

whereby the same personal identification card may be used over and over to obtain repeated access to said accommodation during said particular time period without the need for issuing a new identification card or updating the information stored on the identification card prior to each use thereof;

further including the steps of reading the personal identification card of an individual at the time the individual checks out of the place of lodging, and storing in the data bank the time and date on which the personal identification card was read at check-out for purposes of billing the individual for the time during which accommodations were used by the individual.

20. A method of validating a reservation for and obtaining access to a rental vehicle, comprising the steps of:

making a reservation for a rental vehicle to be picked up at a particular location by a particular individual;

issuing to the particular individual a reusable personal identification card having stored thereon identification information corresponding to the individual, but no specific reservation or vehicle rental information, in response to the making of a reservation for the particular individual;

storing reservation data, which identifies the particular individual, credit account information for the particular individual to be used in the charge for a vehicle rental and the rental vehicle pickup location for which the reservation has been made, in a reservation data storage area of a data bank;

reading the personal identification card of the individual at the vehicle pickup location to verify the reservation for the particular vehicle rental, by accessing the reservation data stored in the data bank;

providing a printout of information relating to said vehicle rental at said vehicle pickup location in response to the verification of said reservation; and providing the individual access to the keys of a rental vehicle after the personal identification card is read and the reservation has been verified;

whereby the same personal identification card may be used over and over to validate a reservation for a rental vehicle without the need for issuing either a new identification card or updating the information stored on the identification card prior to each reservation.

21. A method as defined in claim 20, said personal identification card is read at said vehicle pickup location without the assistance of an employee of an entity providing the vehicle rental.

22. A method of renting a vehicle and obtaining access to a rental vehicle, comprising the steps of:

issuing to the particular individual a reusable personal identification card having stored thereon identification information corresponding to the individual, but no specific reservation or vehicle rental information;

storing personal data, which identifies the particular individual and credit account information for the particular individual to be used in the charge for a vehicle rental, in a reservation data storage area of a data bank;

reading the personal identification card of the individual at a vehicle pickup location to initiate a rental of a vehicle, by accessing the personal data stored in the data bank to verify the identity of said particular individual;

providing a printout of information relating to said vehicle rental, including directions to the location of the vehicle to be rented and other information relating to said rental, at said vehicle pickup location in response to the verification of the identity of said particular individual; and providing the individual access to the keys of the rental vehicle after the personal identification card is read;

whereby the same personal identification card may be used over and over to effect rental of a vehicle without the need for issuing either a new identification card or updating the information stored on the identification card prior to each reservation.

* * * * *